US012700653B2

(12) United States Patent
Lingel et al.

(10) Patent No.: US 12,700,653 B2
(45) Date of Patent: Aug. 4, 2026

(54) STACKED DOUBLE JUNCTION CIRCULATOR DEVICE AND METHODS FOR FABRICATION

(71) Applicant: TTM Technologies, Inc., Santa Ana, CA (US)

(72) Inventors: Thomas Lingel, Cazenovia, NY (US); Tyler McGrath, Camden, NY (US); Matthew William Edlich, Rochester, NY (US)

(73) Assignee: TTM Technologies, Inc., Santa Ana, CA (US)

( * ) Notice: Subject to any disclaimer, the term of this patent is extended or adjusted under 35 U.S.C. 154(b) by 143 days.

(21) Appl. No.: 18/629,042

(22) Filed: Apr. 8, 2024

(65) Prior Publication Data

US 2025/0316876 A1 Oct. 9, 2025

(51) Int. Cl.
*H01P 1/383* (2006.01)
*H01P 11/00* (2006.01)

(52) U.S. Cl.
CPC .............. *H01P 1/383* (2013.01); *H01P 11/00* (2013.01)

(58) Field of Classification Search
CPC .......... H01P 1/383; H01P 1/387; H01P 11/00; H01P 1/38; H01P 1/36; H01P 1/32
USPC .......................................................... 333/1.1
See application file for complete search history.

(56) References Cited

U.S. PATENT DOCUMENTS 6,750,731 B2 * 6/2004 Emanuelsson .......... H01P 1/387 333/1.1
8,183,952 B2 5/2012 Bunce et al.

* cited by examiner

*Primary Examiner* — Andrea Lindgren Baltzell
*Assistant Examiner* — Abigail Amir Yaldo
(74) *Attorney, Agent, or Firm* — Polsinelli PC

(57) ABSTRACT

The disclosure provides designs and methods of fabrication of stacked double junction circulator device that includes two or more ferrite elements. The disclosed stacked double junction circulator device uses a single magnet, instead of two magnets that are conventionally used for the side-by-side double junction circulator. The disclosed stacked double junction circulator device offers significant advantages in regards to installation requirements on the customer side.

26 Claims, 12 Drawing Sheets

STACKED DOUBLE JUNCTION CIRCULATOR DEVICE AND METHODS FOR FABRICATION

FIELD

The disclosure is directed to the design and methods for fabricating a stacked double junction circulator device. In particular, a stacked double junction circulator is a device that allows tight packaging to reduce real estate requirements.

BACKGROUND

Circulators are widely used components within various microwave systems, including telecommunication equipment, amplifier or radar installations. The circulators provide non-reciprocal functionality that is essential for duplexing applications, amplifier protection or non-coherent signal combining.

Circulators are traditionally 3-port devices but other configurations that use four or more ports may be necessary in some cases. When power is injected into port 1, most power exits port 2. When power is injected into port 2, most power exits port 3. When power is injected into port 3, most power exits port 1.

Circulators are widely used on radio frequency (RF) systems as duplexer to allow a function of simultaneously transmitting and receiving through a common antenna.

Circulators utilize specialized microwave ferrites that are good insulators and allow for a low loss propagation of RF signals through the ferrites. The ferrites are ceramic like materials typically based on iron oxide ($Fe_2O_3$) formulation and are soft magnetic. The ferrites are magnetically biased by a static magnetic bias field, that sets the properties (e.g., permeability) of a radio frequency (RF) tensor that ultimately enables non-reciprocal operation of a device. The static bias field is usually provided by permanent magnets. Common commercial magnets include ceramic, AlNiCo or rare earth materials like SmCO or NdFeB.

The ferrites can be operated above or below ferromagnetic resonance depending upon frequency range, bandwidth and power handling requirements. For the disclosure, an operation biased below ferromagnetic resonance is assumed.

The circulator can be designed with either clockwise (CW) or counterclockwise (CCW) operation by changing the polarity of the magnetic bias field. The direction is set by a statically applied magnetic bias. In a clockwise circulator, if a signal is applied to a port, then the signal will exit the next port in a clockwise direction while the next port in a counterclockwise direction is isolated, i.e., the next port receives no signal, and vice versa if the circulator is in a counterclockwise direction.

Classic designs of circulators utilize waveguide, stripline, or microstrip approaches. The 3-port circulator has three branches extending symmetrically outward from the central conductive portion ideally 120° apart from each other. In the case of waveguide circulators, ferrite structures are placed within waveguide arrangements and statically biased using permanent magnets. For a stripline design of the circulator, a center circuit trace is sandwiched between two ferrites components and surrounded by grounding structures. The circuit trace is commonly made from phosphor bronze, copper, or other conduction materials and are typically plated to provide corrosion protection and improve insertion loss. Additional components, including permanent magnets, pole pieces, housings are necessary to keep the mechanical structure together. Often a steel housing is utilized as a magnetic return path. In case of a microstrip design of the circulator, a permanent magnet is adhered to a ferrite substrate that is pre-metallized using thick film or thin film technology. A steel pole piece may be inserted adjacent to the magnet. The function of the steel pole member is to improve the biasing magnetic field uniformity.

Conventional stripline circulators are often large, which is due to the need to have a housing as described above. Often, the circulator is the tallest component in a subsystem design on a printed circuit board (PCB). It is desirable to have the circulator as small as possible, both in an x-y plane and in a z-direction perpendicular to the x-y plane. The dimension along the z-direction is referred to as profile height for the circulators.

There remains a need to develop methods for reducing the size of the circulators and product costs.

BRIEF SUMMARY

In one aspect, a device includes a bottom ground plane; a first dielectric layer disposed over the bottom ground plane; a first junction circuit disposed on a top side of the first dielectric layer opposite from the bottom ground plane; a second dielectric layer disposed over the first dielectric layer, the second dielectric layer having a first opening that embeds a first ferrite element; a third dielectric layer disposed over the second dielectric layer; a first middle ground layer between the second dielectric layer and the third dielectric layer; a fourth dielectric layer disposed over the third dielectric layer, the fourth dielectric layer having a second opening that embeds a second ferrite element aligned with the first ferrite element; a second middle ground layer between the third dielectric layer and the fourth dielectric layer; a fifth dielectric layer disposed over the fourth dielectric layer, wherein the fifth dielectric layer including a second junction circuit on a bottom side adjacent to the fourth dielectric layer.

In some aspects, the device may also include a top ground plane disposed over the fifth dielectric layer opposite to the second junction circuit.

In some aspects, the first junction circuit may include a first junction of circuit traces aligned with the first ferrite element.

In some aspects, the second junction circuit may include a second junction of circuit traces aligned with the second ferrite element.

In some aspects, the first junction circuit may include a first circuit port connected to a transmitter as a first RF port; a second circuit port connected to a first circuit port of the second junction circuit; and a third circuit port connected to a termination resistor as a fourth RF port.

In some aspects, the second junction circuit may include a second circuit port connecting to an antenna as a second RF port and a third circuit port connecting to a receiver as a third RF port.

In some aspects, the device may include a magnet over the top ground plane for providing magnetic bias.

In some aspects, each of the first ferrite element and the second ferrite element may be in one of a circular shape, triangular shape, or hexagon shape.

In some aspects, the device may also include a third junction circuit disposed over a top side of the fifth dielectric layer opposite to the second junction circuit; a sixth dielectric layer disposed over the fifth dielectric layer, the sixth dielectric layer having a third opening that embeds a third ferrite element aligned with the first ferrite element and the second ferrite element; and a seventh dielectric layer disposed over the sixth dielectric layer; a top ground plane disposed over the seventh dielectric layer; and a lower ground plane on an opposite side of the seventh dielectric layer to the top ground plane.

In some aspects, the first junction circuit may also include a first junction of circuit traces aligned with the first ferrite element. The second junction circuit may include a second junction of circuit traces aligned with the second ferrite element. The third junction circuit may include a third junction of circuit traces aligned with the third ferrite element.

In some aspects, the device may be configured to be an isolator by adding a termination component.

In some aspects, the termination component may be integrated with the device.

In some aspects, the termination component may be positioned on a PCB adjacent to the device.

In some aspects, the device may include a first RF port, a second RF port, a third RF port, and a fourth RF port.

In some aspects, the device may be suitable for radio frequency applications.

In some aspects, the device may be a surface mount component on a Printed circuit board (PCB).

In some aspects, a method is provided for fabricating the device. The method includes embedding the first ferrite element in the first opening of the second dielectric layer. The method also includes embedding the second ferrite element in the second opening of the fourth dielectric layer. The method also includes aligning the first ferrite element with the second ferrite element. The method also includes aligning the first junction circuit with the second junction circuit. The method also includes forming a stack including the first, second, third, fourth, and fifth dielectric layers, the top ground plane, the first and second middle ground layers, the bottom ground plane, the first junction circuit, the second junction circuit, the first ferrite element, and the second ferrite element.

In some aspects, the method may also include bonding two adjacent dielectric layers using fusion bonding.

In some aspects, the method may also include bonding two adjacent dielectric layers using a liquid resin or prepreg material.

In some aspects, the first dielectric layer includes the first junction circuit on a top side and the bottom ground plane on an opposite side to the first junction circuit.

In some aspects, the fifth dielectric layer includes the top ground plane on a top side and the second junction circuit on an opposite side to the top ground plane.

In some aspects, to form a stack includes disposing the second dielectric layer over the first dielectric layer such that the first junction circuit facing the first ferrite element; disposing the fifth dielectric layer over the fourth dielectric layer such that the second junction circuit facing the second ferrite element; disposing the first middle ground layer between the second dielectric layer and the third dielectric layer; and disposing the second middle ground layer between the third dielectric layer and the fourth dielectric layer.

In some aspects, the method may also include placing a magnet on the fifth dielectric layer opposite to the second junction circuit; and attaching the magnet to the fifth dielectric layer of the stack.

Additional aspects and features are set forth in part in the description that follows and will become apparent to those skilled in the art upon examination of the specification or may be learned by the practice of the disclosed subject matter. A further understanding of the nature and advantages of the disclosure may be realized by reference to the remaining portions of the specification and the drawings, which form a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

The disclosure may be understood by reference to the following detailed description, taken in conjunction with the drawings as described below. It is noted that, for purposes of illustrative clarity, certain elements in various drawings may not be drawn to scale.

Overview

Circulators and isolators are commonly used microwave components that realize non-reciprocal functionality by using specific microwave ferrite materials. The properties of these materials are controlled via a DC magnetic bias field. Circulators are widely used devices in radar systems or power amplifiers.

The presented technology addresses the need of reducing space requirements for a double junction circulator device and to reduce costs. The disclosure provides a stacked double junction circulator device, which may include two ferrites, three ferrites or four ferrites, among other.

In one aspect, the stacked double junction circulator device uses two ferrites, instead of four ferrites that are conventionally used for a side-by-side double junction stripline circulator. Also, the disclosed stacked double junction circulator device uses a single magnet, instead of two magnets that are conventionally used for the side-by-side double junction circulator. The single magnet needs to be magnetized. The disclosed stacked double junction circulator device offers significant advantages in regards to installation requirements on the customer side (e.g., reduced space requirement, surface mountable component, improved integration capabilities).

The disclosure provides a process description for fabricating the stacked double junction circulator device. The manufacturing process includes the use of dielectric layers that have conductive layers on both sides. The conductive layers can be etched to form junction circuits or ground planes or ground layers. The manufacturing process also includes bonding dielectric layers by fusion bonding or bonding dielectric layers using a liquid resin or prepreg materials.

The disclosed stacked double junction circulator device uses a biased below ferromagnetic resonance approach that is commonly used for higher frequency devices. The reduced magnitude of the required static magnetic field allows to use a single permanent magnet, preferably Samarium Cobalt (SmCo) magnet that is conducive to solder reflow operations. The disclosed stacked double junction circulator device does not need to have an additional return path (e.g., a steel housing) to fully saturate the ferrites and establish the required bias field since the bias magnitude for an operation below ferromagnetic resonance is low. The elimination of the additional return path also helps to reduce the size of the stacked double junction circulator.

The disclosed stacked double junction circulator device can achieve double junction functionality with significant reduced size and costs. The device enables advantages for various integration scenarios on the customer site.

Figure 1:
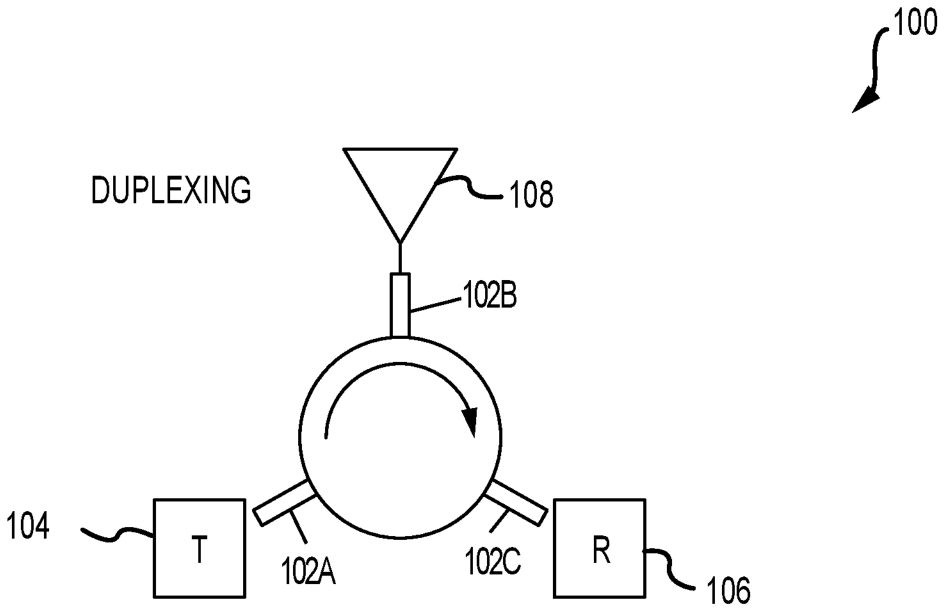
FIG. 1 illustrates an example single junction circulator used for duplexing.

FIG. 1 illustrates an example single junction circulator. A circulator 100 includes three ports 102A, 102B, and 102C. A transmitter 104 connects to a first port 102A. RF signal 108 can be input into a second port 102B. A receiver 106 connects to a third port 102C.

In operation, when an RF signal is directed into the first port 102A, the RF signal will be accessible via the second port 102B in sequence. The RF signal will be substantially attenuated and will not be available at the third port 102C in the sequence. On the other hand, if an RF signal is directed into the second port 102B, it will be available as an RF output signal at the third port 102C, but will not be available at the first port 102A. Finally, if an RF signal is introduced at the third port 102C, it will be available as an RF output at the first port 102A, but not at the second port 102B. A circulator, therefore, propagates RF power from one adjacent port to the next port in a sequential, circular fashion. The RF signal circulation may be right-handed (RH) or left-handed (LH).

Figure 2:
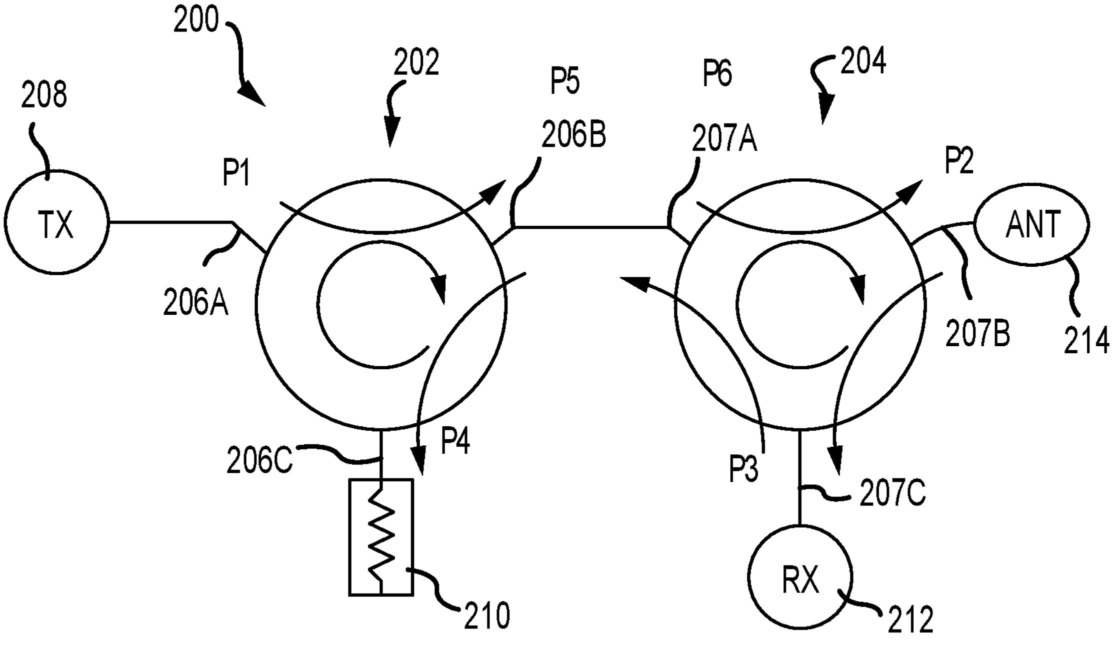
FIG. 2 illustrates an example for a double junction circulator.

Now that the general operating principles have been briefly touched upon, a similarly brief description of the structure of a junction circulator is provided. FIG. 2 illustrates an example for a double junction circulator. A double junction circulator 200 includes first and second single junction circulators 202 and 204 and four ports, i.e., P1, P2, P3, and P4. The first single junction circulator 202 includes first, second, and third ports 206A, 206B, and 206C. The second single junction circulator 204 includes first, second, and third ports 207A, 207B, and 207C. The first port 206A of the first single junction circulator 202 connects to a transmitter 208 and is P1 or the first port of the double junction circulator 200. The second port 206B of the first single junction circulator 202 connects to the first port 207A of the second single junction circulator 204. The connection combines ports 5 and 6. The third port 206C of the first single junction circulator 202 connects to termination resistor 210, and is P4 or the fourth port of the double junction circulator 200. The second port 207B of the second single junction circulator 204 is P2 or the second port of the double junction circulator 200. The second port 207B connects to an antenna 214. The third port 207C of the second single junction circulator 204 connects to a receiver 212 and is P3 or the third port of the double junction circulator 200.

Figure 3:
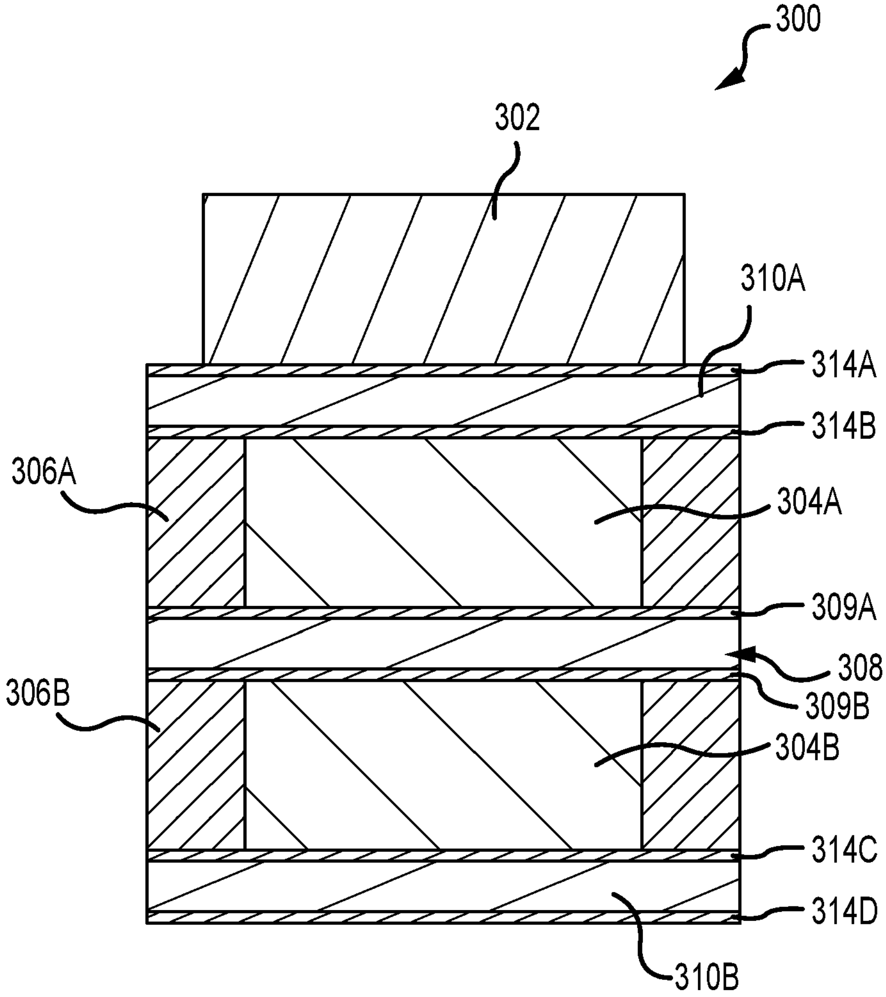
FIG. 3 illustrates a sectional side view of a legacy surface mountable single junction circulator.

FIG. 3 illustrates a sectional side view of a legacy surface mountable single junction circulator. A legacy surface mountable single junction circulator 300 is disclosed in U.S. Pat. No. 8,183,952, entitled "Surface Mountable Circulator," by Graeme Bunce and Thomas Lingel, issued on May 22, 2012, which is incorporated by reference in its entirety. As illustrated, the surface mountable single junction circulator 300 includes a first trace layer 309A between an upper middle dielectric layer 306A and a middle dielectric layer 308, and a second trace layer 309B between the middle dielectric layer 308 and a lower middle dielectric layer 306B embedded with ferrites 304A and 304B. The trace layers 309A-B include junction circuits. The circulator 300 also includes top dielectric layer 310A disposed over the upper middle dielectric layer 306A. The top dielectric layer 310A includes a ground plane 314A on its top side and a ground plane 314B on its bottom side opposite to the ground plane 314A. The ground plane 314B is bonded or laminated to the upper middle dielectric layer 306A. The circulator 300 also includes a bottom dielectric layer 310B disposed under the lower middle dielectric layer 306B. The bottom dielectric layer 310B includes a ground plane 314D on its bottom. a ground plane 314 on its top opposite to the ground plane 314D. The ground plane 314 is bonded or laminated to the lower middle dielectric layer 306B. A permanent magnet 302 may be bonded or attached to the ground layer or ground plane 314A on top of the top dielectric layer 310A. The permanent magnet 302 provides the static bias field for the operation of the circulator 300. The method for fabricating the surface mountable single junction circulator 300 is based on embedding ferrites 304A and 304B into dielectric layers 306A and 306B that are laminated.

Figure 4:
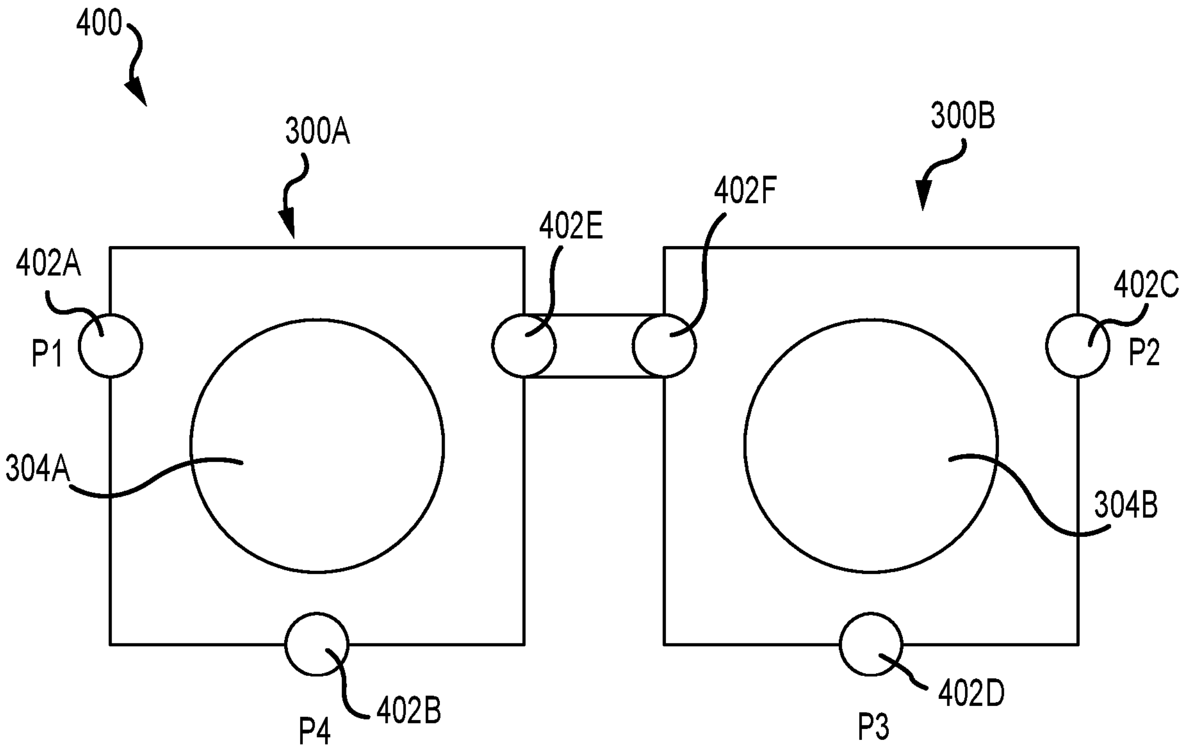
FIG. 4 illustrates a conventional side-by-side mounting of double junction circulator using single junction circulator devices.

FIG. 4 illustrates a conventional side-by-side mounting of double junction circulator using single junction circulator devices. A conventional side-by-side double junction circulator 400 includes two single junction circulator devices 300A and 300B that are integrated to realize double junction functionality. The conventional side-by-side double junction circulator 400 arranges two circulators side-by-side, which increases size requirements and costs. Each of device 300A and 300B can be the surface mountable single junction circulator 300. A first device 300A includes three ports 402A, 402B, and 402E. A second device 300B includes three ports 402C, 402D, and 402F. The port 402E of the first device 300A connects to the port 402F of the second device 300B. The double junction circulator 400 includes four ports 402A (P1), 402C (P2), 402D (P3), and 402B (P4). The first device 300A includes two ferrites 304A. The second device 300B includes two ferrites 304B. Thus, the conventional side-by-side double junction circulator 400 include four ferrites. Also, each of the first and second device 300A and 300B includes a magnet such that the conventional side-by-side double junction circulator 400 includes two magnets.

The two single junction circulator devices can be used. However, real estate requirements would still be big and a minimum of two magnets are necessary for two single junction devices.

Figure 5:
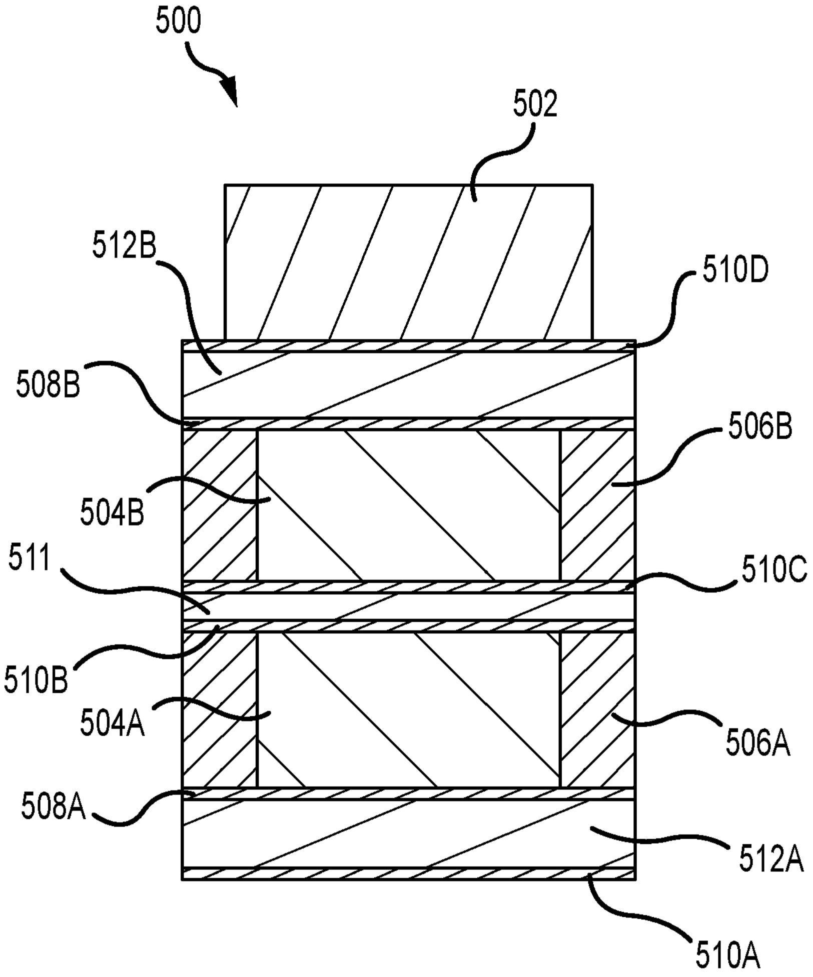
FIG. 5 illustrates a sectional view of a stacked double junction circulator including two ferrite elements according to one aspect of the disclosure.
Figure 6:
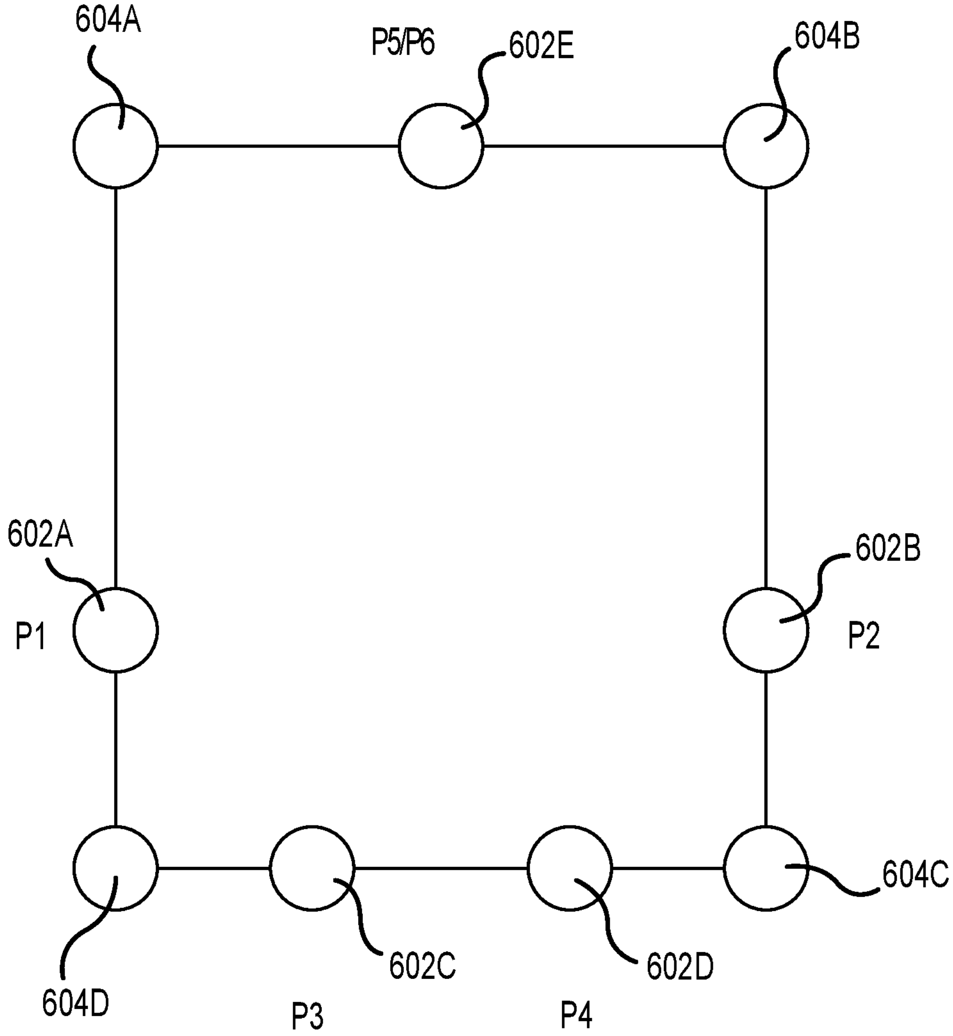
FIG. 6 illustrates a top view of a port layout including port locations for the stacked double junction circulator of FIG. 5 according to one aspect of the disclosure.
Figure 7:
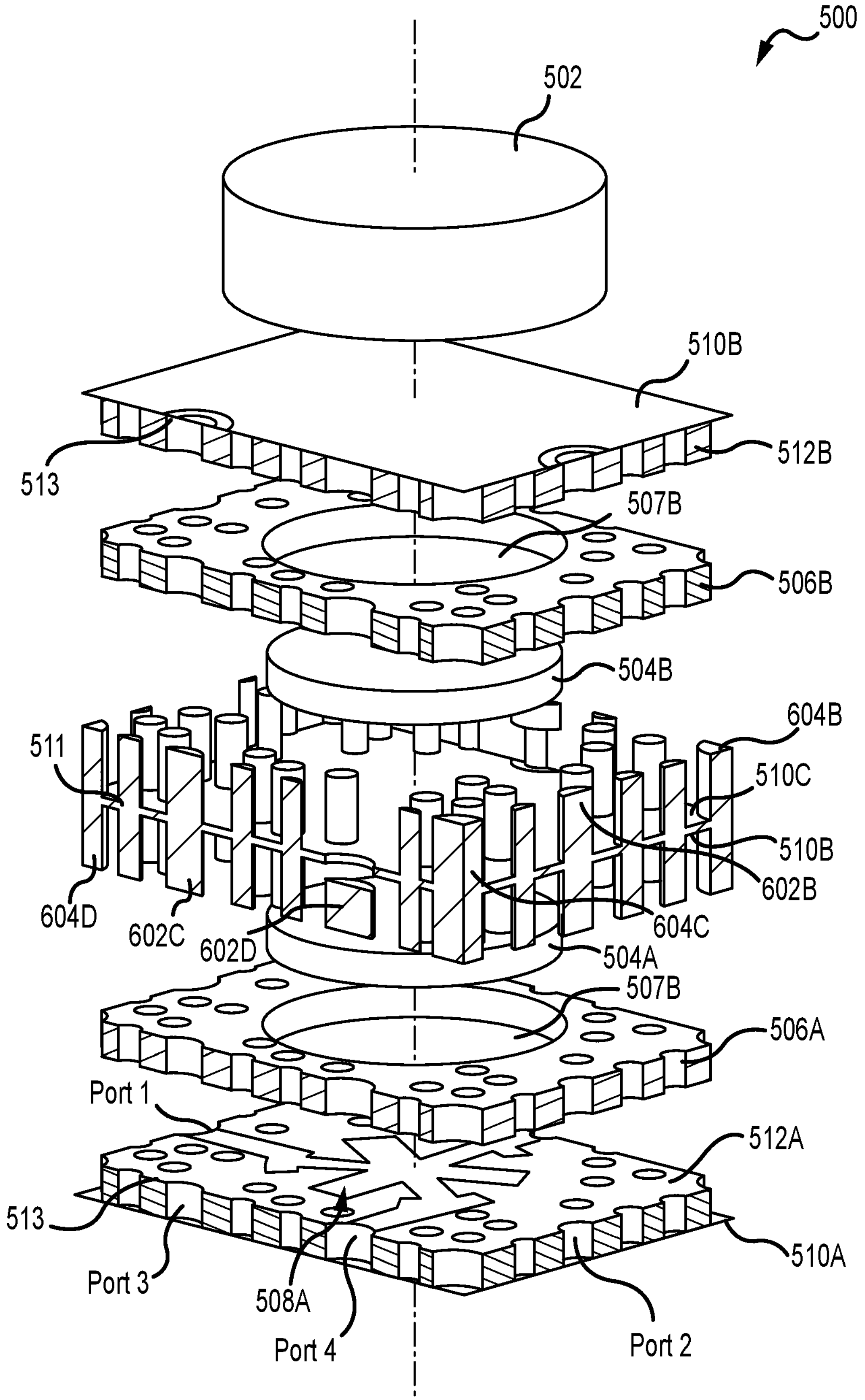
FIG. 7 illustrates an exploded view of the stacked double junction circulator of FIGS. 5 and 6 according to one aspect of the disclosure.
Figure 8A:
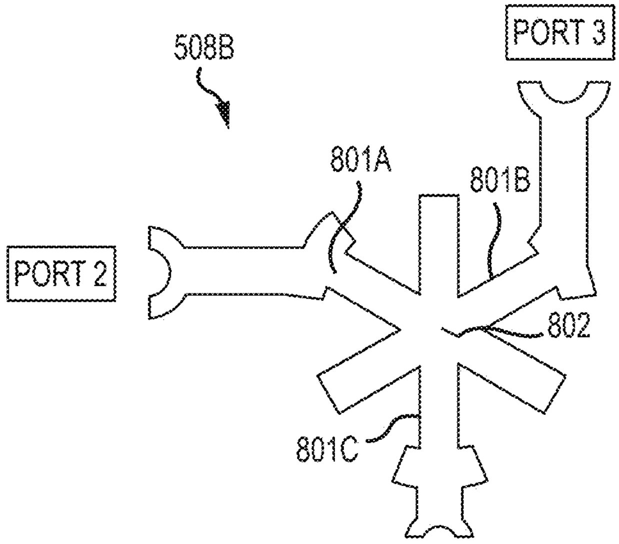
FIG. 8A illustrates a view of the top junction circuit of FIG. 5 according to one aspect of the disclosure.
Figure 8B:
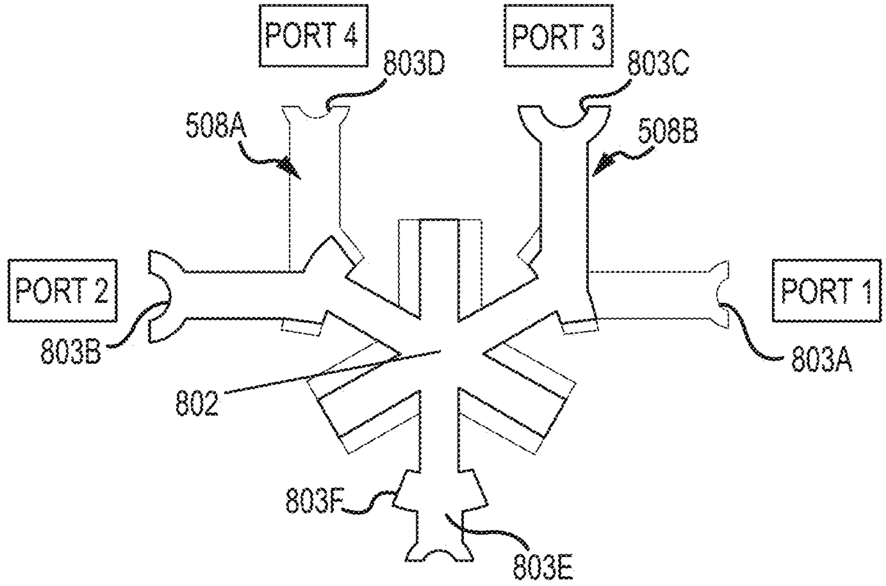
FIG. 8B illustrates a top view of the top and bottom junction circuits of FIG. 5 overlaying each other according to one aspect of the disclosure.
Figure 8C:
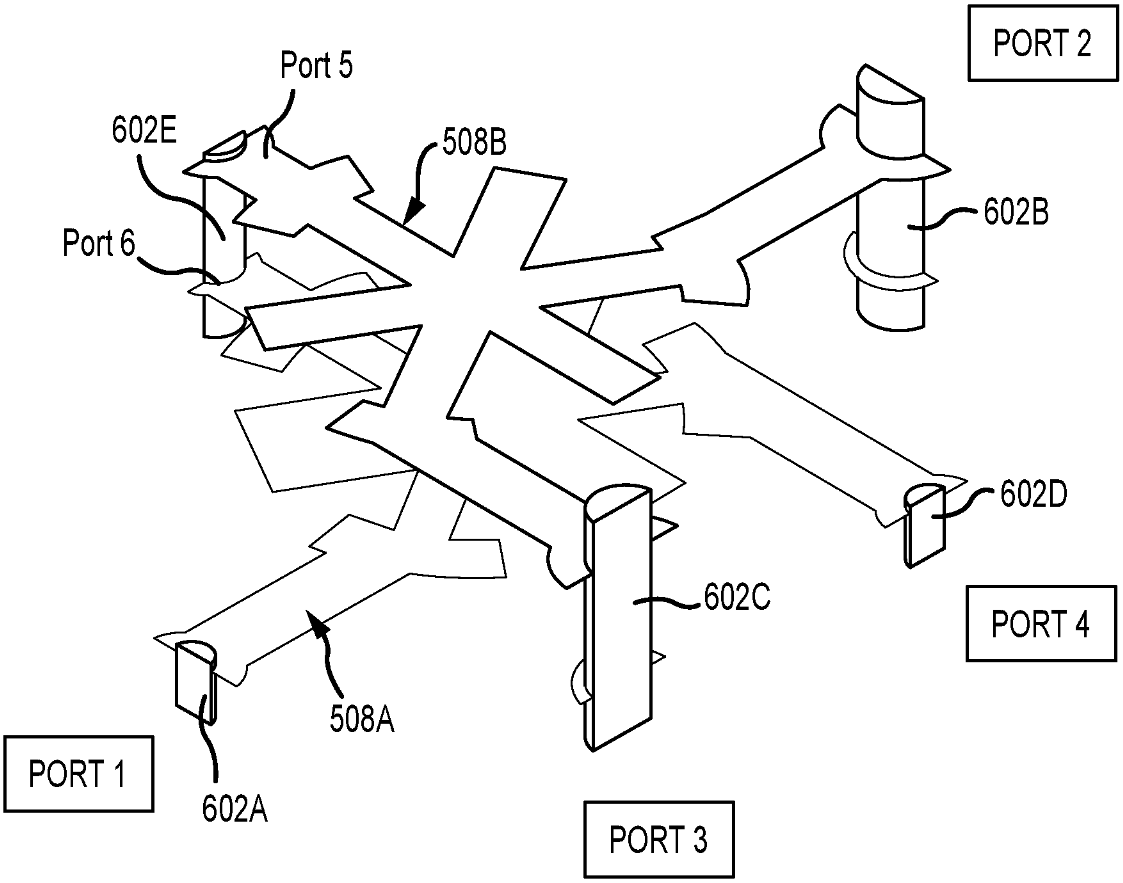
FIG. 8C illustrates a perspective view of the top and bottom junction circuits of FIG. 5 overlaying each other according to one aspect of the disclosure.
Figure 10:
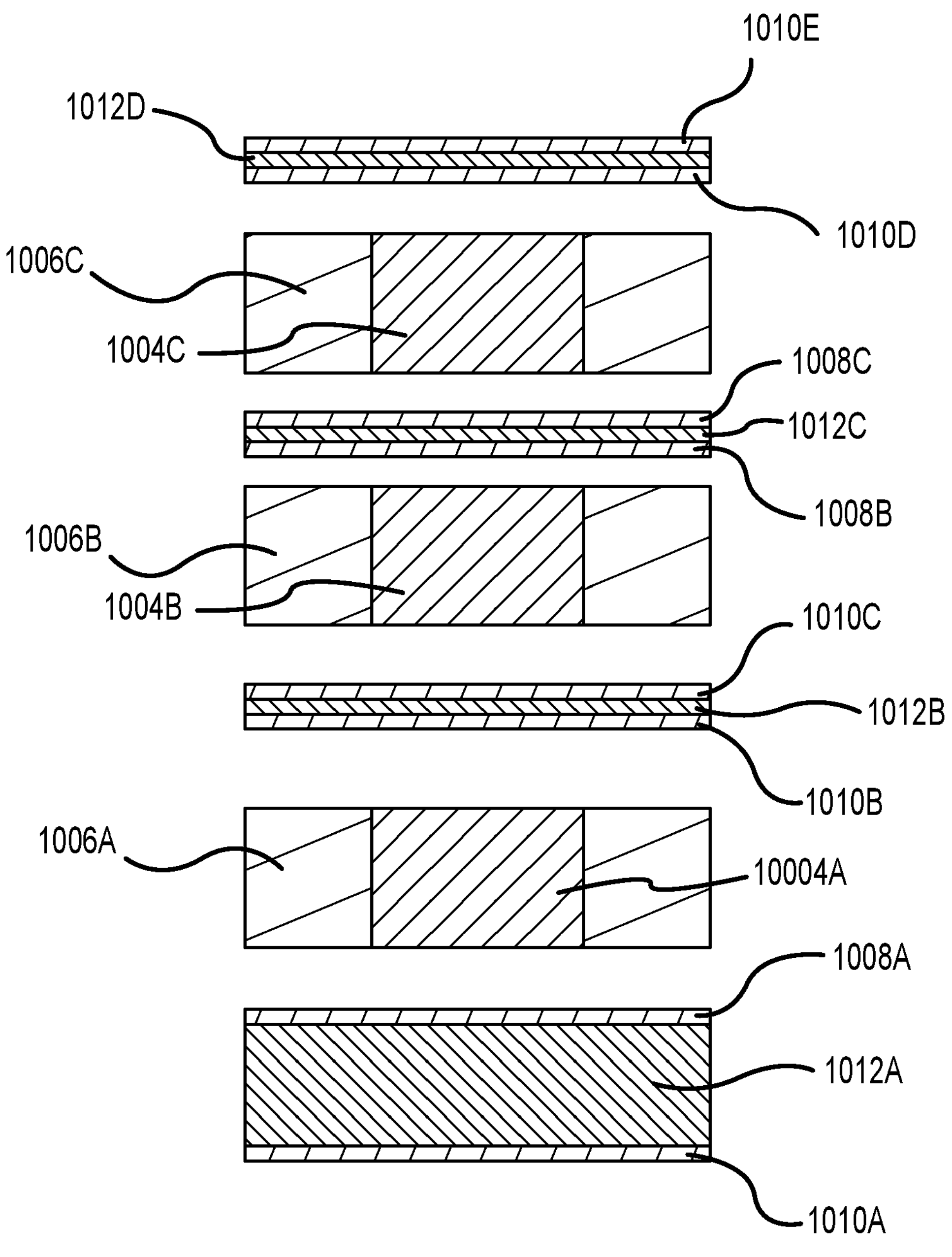
FIG. 10 illustrates a sectional view of a stacked double junction circulator including three ferrite elements prior to stacking together according to one aspect of the disclosure.
Figure 11:
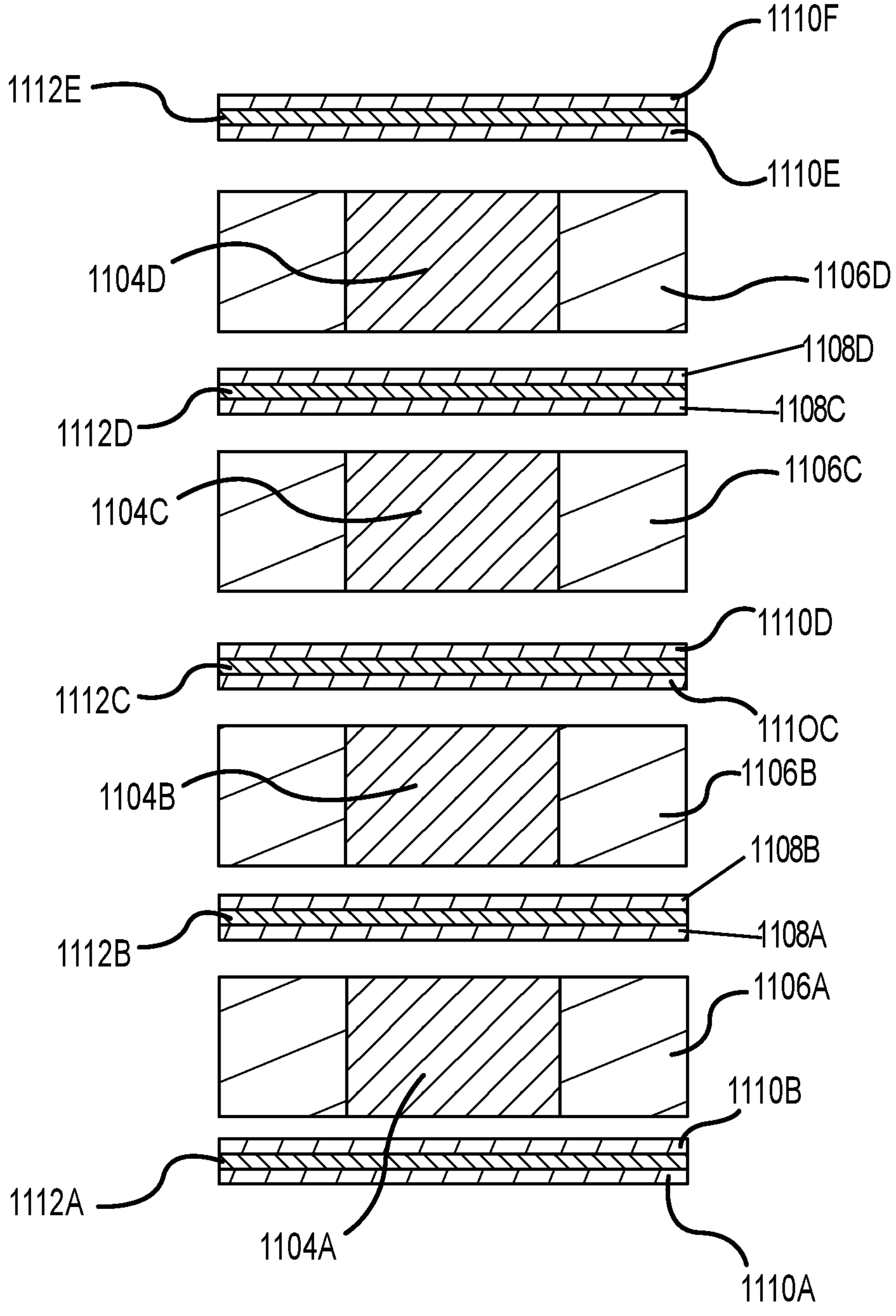
FIG. 11 illustrates a sectional view of a stacked double junction circulator including four ferrite elements prior to stacking together according to one aspect of the disclosure.

The present technology provides various configurations of the stacked double junction circulator device, which may use a single ferrite for each of two junction circuits such that the number of ferrites is reduced in the double junction circulator device. The stacked double junction circulator is illustrated in FIGS. 5-7, FIGS. 8A-8C, and FIGS. 10-11. FIG. 5 illustrates a sectional view of a stacked double junction circulator including two ferrite elements according to one aspect of the disclosure. FIG. 6 illustrates a top view of a port layout including port locations for the stacked double junction circulator of FIG. 5 according to one aspect of the disclosure. FIG. 7 illustrates an exploded view of the stacked double junction circulator of FIGS. 5 and 6 according to one aspect of the disclosure. Example junction circuits 508A and 508B are illustrated in FIGS. 8A-8C. FIG. 10 illustrates a sectional view of a stacked double junction circulator including three ferrite elements according to one aspect of the disclosure. FIG. 11 illustrates a sectional view of a stacked double junction circulator including four ferrite elements according to one aspect of the disclosure.

Referring to FIG. 5 now, a stacked double junction circulator device 500 includes five dielectric layers with first, second, third, fourth and fifth dielectric layers starting from the bottom of the stack. The stacked double junction circulator device 500 also includes two junction circuits and four ground planes. The ground planes may be formed of a metallic material (e.g., a copper foil material).

The device 500 includes a first dielectric layer or bottom dielectric layer 512A that includes a bottom junction circuit 508A formed thereon. The first dielectric layer or bottom dielectric layer 512A may include a lower ground plane 510A formed on an exposed surface and disposed on an opposite side of bottom dielectric layer 512A to the bottom junction circuit 508A layer. The bottom dielectric layer 512A may also provide support for the bottom junction circuit or a first junction circuit 508A which is on opposite side to the lower ground plane 510A and is adjacent to and in contact with, a first ferrite element 504A.

The device 500 also includes a second dielectric layer or a lower interior dielectric layer 506A disposed over the first dielectric layer or bottom dielectric layer 512A, i.e., the bottom dielectric layer 512A is disposed under the lower interior dielectric layer 506A. The second dielectric layer 506A has an opening or cutout in a center. The device 500 also includes the first ferrite element 504A with the first junction circuit 508A embedded between the second dielectric layer or lower interior dielectric layer 506A. The first ferrite element 504A may be disk shaped. The first ferrite element 504A may also be in a triangular shape or hexagon shape, among others. It will be appreciated by those skilled in the art that ferrite element can have any particular geometric shape.

The device 500 may also include a third dielectric layer or middle dielectric layer 511 disposed over the second dielectric layer 506A. The middle dielectric layer 511 includes a first middle ground layer 510B on its bottom surface or bottom side and a second middle ground layer 510C on its top surface or top side. The first middle ground layer 510B is positioned between the middle dielectric layer 511 and the second dielectric layer or the lower interior dielectric layer 506A. The second middle ground layer 510C is positioned between an upper interior dielectric layer 506B and the third dielectric layer 511 or the middle dielectric layer 511. The device 500 also includes a fourth dielectric layer or an upper interior dielectric layer 506B disposed under the top dielectric layer 512B. The fourth dielectric layer 506B has an opening or cutout in a center. The device 500 also includes a second ferrite element 504B that is above a second junction circuit 508B. The second ferrite element 504B is embedded within the opening of the upper interior dielectric layer 506B. The second ferrite element 504B may be disk shaped. The second ferrite element 504B may also be in a triangular shape or hexagon shape, among others. It will be appreciated by those skilled in the art that ferrite element can have any particular geometric shape.

The stacked double junction circulator device 500 includes a fifth dielectric layer or top dielectric layer 512B disposed over the fourth dielectric layer or the upper interior dielectric layer 506B. The top dielectric layer 512B may include an upper or top ground plane 510D (e.g., a copper foil material) formed on an exposed surface. The top dielectric layer 512B may also provide support for a second junction circuit 508B which is adjacent to and in contact with, a second ferrite element 504B.

In some variations, the thicknesses of the dielectric layers 512A and 512B may be the same as the dielectric layer 506.

In some variations, the thicknesses of the dielectric layers 512A and 512B may be different from that of the dielectric layer 506, which may have an impact on bandwidth.

The device 500 also includes a permanent magnet 502 that may be bonded to the upper or top ground plane 510D to provide the necessary magnetic biasing field to the ferrite elements. In other embodiments, the magnetic bias may be provided by an external magnet, a solenoid, or by other means to provide such bias.

In some variations, the permanent magnet 502 may not be part of the assembly of FIG. 5. In this embodiment, the magnet 502 may be replaced by any suitable biasing element provided by the end application. For example, the device 500 may be employed in an RF assembly that includes a solenoid, a magnet or some other suitable biasing means that provides the functionality provided by magnet 502.

In the device 500, various layers are stacked above the middle dielectric layer 511. In this embodiment however, various layers are disposed underneath the first middle ground layer 510B. The upper layers including top ground plane 510D, top dielectric layer 512B, top junction circuit layer 508B, upper interior dielectric layer 506B embedded with ferrite element 504B and second middle ground plane 510C may be viewed as the mirror image of the bottom layers 506A including bottom ground plane 510A, bottom dielectric layer 512A, bottom junction circuit layer 508A, lower interior dielectric layer 506A embedded with ferrite element 504A, and first middle ground plane 510B.

The device 500 may be employed in applications up to about 30 GHz or even higher frequencies. The ferrite elements or ferrite disks can be biased below ferromagnetic resonance and primarily utilized in a frequency range having a lower bound of approximately 1 GHz. The ferrite elements are saturated in the presence of the biasing magnetic field. The biasing magnet provides the necessary static magnetic field inside the ferrite element(s). The flux lines are closed through air and no additional housing structures are necessary. In order to improve the magnetic shielding of the device and/or to better utilize the permanent magnet, ferromagnetic return path structures may be employed.

The stacked double junction circulator device 500 also includes four RF ports, i.e., port 1 (P1), port 2 (P2), port 3 (P3), and port 4 (P4). The RF ports P1, P2, P3, and P4 of the stacked double junction circulator device 500 may be arranged for simplified internal routing.

Referring to FIG. 6 now, RF ports P1, P2, P4, P4 of the device 500 may be arranged along the edge of the bottom ground plane. Four ground castellations 604A, 604B, 604C, and 604D may be arranged at the corners of the rectangular shaped ground layers or ground planes. In some embodiments, additional ground vias may be included inside the device as shown in FIG. 7 to improve isolation and to enforce mode suppression. Metallized vias 602A, 602B, 602C, 602D and 602E may be arranged on the exterior edges. Internal ports P5 and P6 overlap on the top exterior edge near the metallized via 602E.

Referring to FIG. 7 now, RF ports P1, P2, P4, P4 of the device 500 may be arranged along the edge of the bottom ground plane 510A. The top dielectric layer 512B accommodates castellated signal through-holes. The top dielectric layer 512B includes two rings 513 surrounding metallized vias 602B and 602C formed along exterior edges of the top dielectric layer 512B and isolating metallized vias 602B and 602C from the top ground plane 510D. The metallized vias 602B and 602C feed through the middle ground planes 510B and 510C without electric connection to the middle ground planes. The two RF ports P2 and P3 connect to the upper junction circuit 508B, respectively, by way of metalized vias 602B, 602C, respectively, formed along the edge of the top dielectric layer 512B. Also, the bottom dielectric layer 512A includes metallized via, 602D formed along exterior edges of the bottom dielectric layer 512A. These metallized vias may be back-drilled for improved RF performance. For example, metallized via 602D may be back-filled from the top. Note that metallized via 602A may also be back-drilled and is hidden in FIG. 7, but is shown in FIG. 8C.

Additional ground vias 523 inside the device 700 and on castellations are present to improve isolation and also help with mode suppression.

Also, as shown in FIG. 7, the lower ground plane 510A includes RF port 1 and RF port 4. The bottom dielectric layer 512A above the lower ground plane 510A accommodates castellated signal through-holes or vias. The bottom dielectric layer 512A also includes metallized vias 602A and 602D formed along exterior edges of the bottom dielectric layer 512B. The metallized vias 602A and 602D extend through lower dielectric layer 506A and do not connect with the middle ground planes 510B and 510C. The two RF ports P1, P4 connect to the lower junction circuit 508A, respectively, by way of metalized vias 602A, 602D, respectively, formed along the edge of the bottom dielectric layer 512A.

Alternatively, through vias may be used. The through vias are insulated from all ground layers when transitioning through the device.

Also, as shown in FIG. 7, the lower interior dielectric layer 506A includes a first opening 507A configured to accommodate and align the first ferrite element 504A with the junction circuit 508A. The lower interior dielectric layer 506A also includes metalized vias 602A and 602D, respectively, formed along the edges of the lower interior dielectric layer 506A. The upper interior dielectric layer 506B includes a second opening 507B configured to accommodate and align the second ferrite element 504B with the upper junction circuit 508B. The upper interior dielectric layer 506B also includes metalized vias 602B and 602C, respectively, formed along the edges of the upper interior dielectric layer 506B.

Example junction circuits 508A and 508B are illustrated in FIGS. 8A-8C. FIG. 8A illustrates a view of the top junction circuit of FIG. 5 according to one aspect of the disclosure. As shown in FIG. 8A, the top or upper junction circuit 508B includes three arms or transmission lines 801A, 801B, and 801C that extend outwardly from a central junction 802. The bottom junction circuit 508A has similar structure to the top junction circuit 508B, including three arms or transmission lines extending from a central junction, as illustrated in FIG. 7.

However, the top junction circuit 508B has a different shape from the bottom junction circuit 508A, which is due to the fact that the bias field is lower in the bottom junction circuit 508A. The difference in the bias field is caused by having a single magnet on the top, so that the single magnet is spaced further away from the bottom ferrite. The shapes of the circuits are varied to counteract the difference in the bias field.

FIG. 8B illustrates a top view of the top and bottom junction circuits of FIG. 5 overlaying each other according to one aspect of the disclosure. As shown in FIG. 8B, the three arms of the two junction circuits 508A and 508A overlap with each other. The top or upper junction circuit 508B has two circuit ports 803B and 803C connected to RF port 2 and RF port 3 of the device 500, respectively. The bottom or lower junction circuit 508A has two circuit ports 803A and 803D connected to RF port 1 and RF port 4 of the device 500, respectively.

The top junction circuit 508B also includes a circuit port 803E. The bottom or lower junction circuit 508A also includes a circuit port 803F, which connects to the circuit port 803E of the upper junction circuit 508A.

FIG. 8C illustrates a perspective view of the top and bottom junction circuits of FIG. 5 overlaying each other according to one aspect of the disclosure. As shown in FIG. 8C and FIG. 7, the metalized vias 602B and 602C connect to upper junction circuit 508B and transition through the upper interior dielectric layer 506B and the upper dielectric layer 512B, and through the lower interior dielectric layer 506A and the bottom dielectric layer 512A, and also through the middle dielectric layer 511 and connect to RF ports 2 and 3, respectively. The metalized vias 602A and 602D transition through the bottom dielectric layer 512A to connect the RF port 1 and RF port 4 to the lower junction circuit 508A. The metalized via 602E connects the lower junction circuit 508A above the bottom dielectric layer 512A to upper junction circuit 508B under the top dielectric layer 512B such that P5 and P6 are internally connected to form the double junction circulator 500. Also, as shown in FIG. 8C, vias 602A, 602D, and 602E have a shorter height than vias 602B and 602C. Metallized vias 602D, 602A, and 602E may be back-drilled from the top for improved RF performance.

Various electric connections are made by metallized vias. For example, the upper ground plane 510D is connected to the first and second middle ground layers 510B and 510C, and the lower or bottom ground plane 510A by way of metalized vias 604A-D ground castellations formed in the five dielectric layers 512A, 512B, 506A, 506B, and 511. The RF ports P1, P2, P3, and P4 are connected to the lower and upper junction circuits 508A and 508B through the metallized vias 602A, 602B, 602C, and 602D. The lower and upper junction circuits 508A and 508B can be connected by metalized via 602E formed through interior dielectric layers 506A and 506B.

The two ferrite elements 504A and 504B enable non-reciprocal function.

Circulator Configured to be an Isolator

The device 500 may be configured to be an isolator to protect a system from unwanted reflected power, caused by a mismatched load. The isolator is a two-port device, which is often realized as a three-port or four-port circulator with one or two ports terminated with a resistive element, such that unwanted incoming power on an output port (e.g., reflections) is directed to the resistive element and then dissipated as heat. For example, the device 500 can be configured to be an isolator by terminating one of the RF ports with a proper matched load such that the complex impedance of the load is the complex conjugate of the output port impedance. The isolator permits RF signal propagation between the two remaining ports in one direction only. RF power flow in the opposite direction is substantially inhibited.

In some variations, the device may be configured to be an isolator by adding a termination component, which can be a resistive element.

In some variations, the termination component may be integrated with the device.

In some variations, the termination component may be positioned on a PCB adjacent to the device.

Example Surface Mountable Double Junction Circulator Device

Figure 9A:
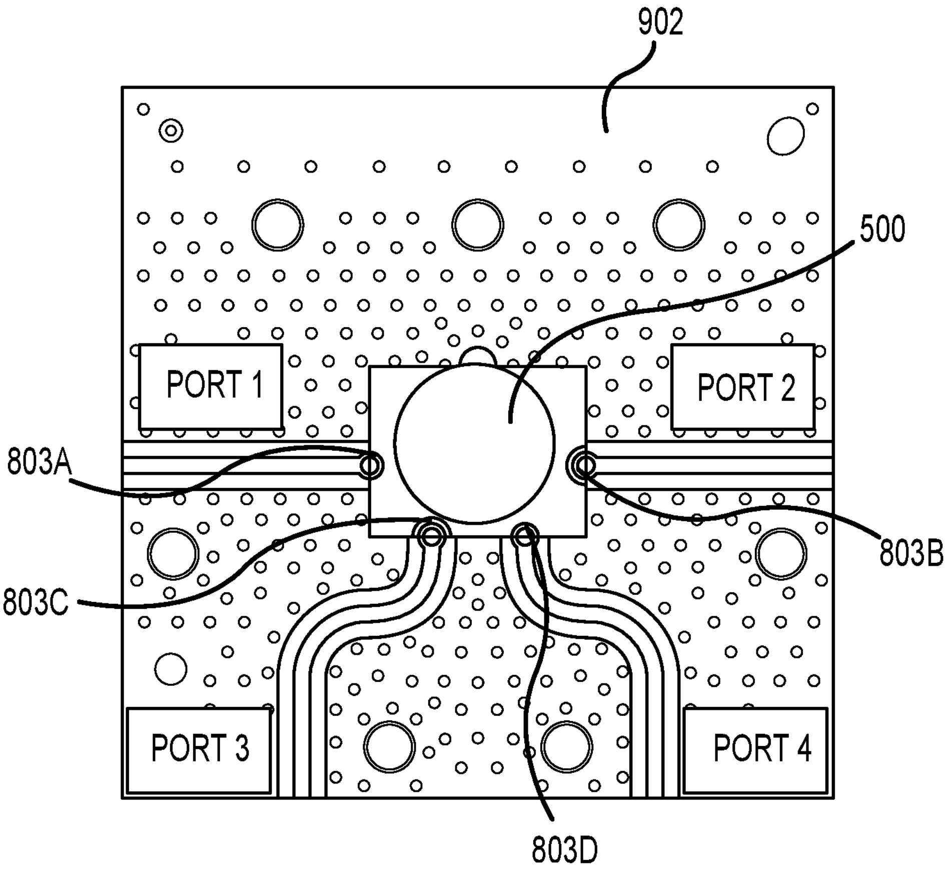
FIG. 9A illustrates a top view of an application of a stacked double junction circulator on a mounting test board according to one aspect of the disclosure circulator according to one aspect of the disclosure.
Figure 9B:
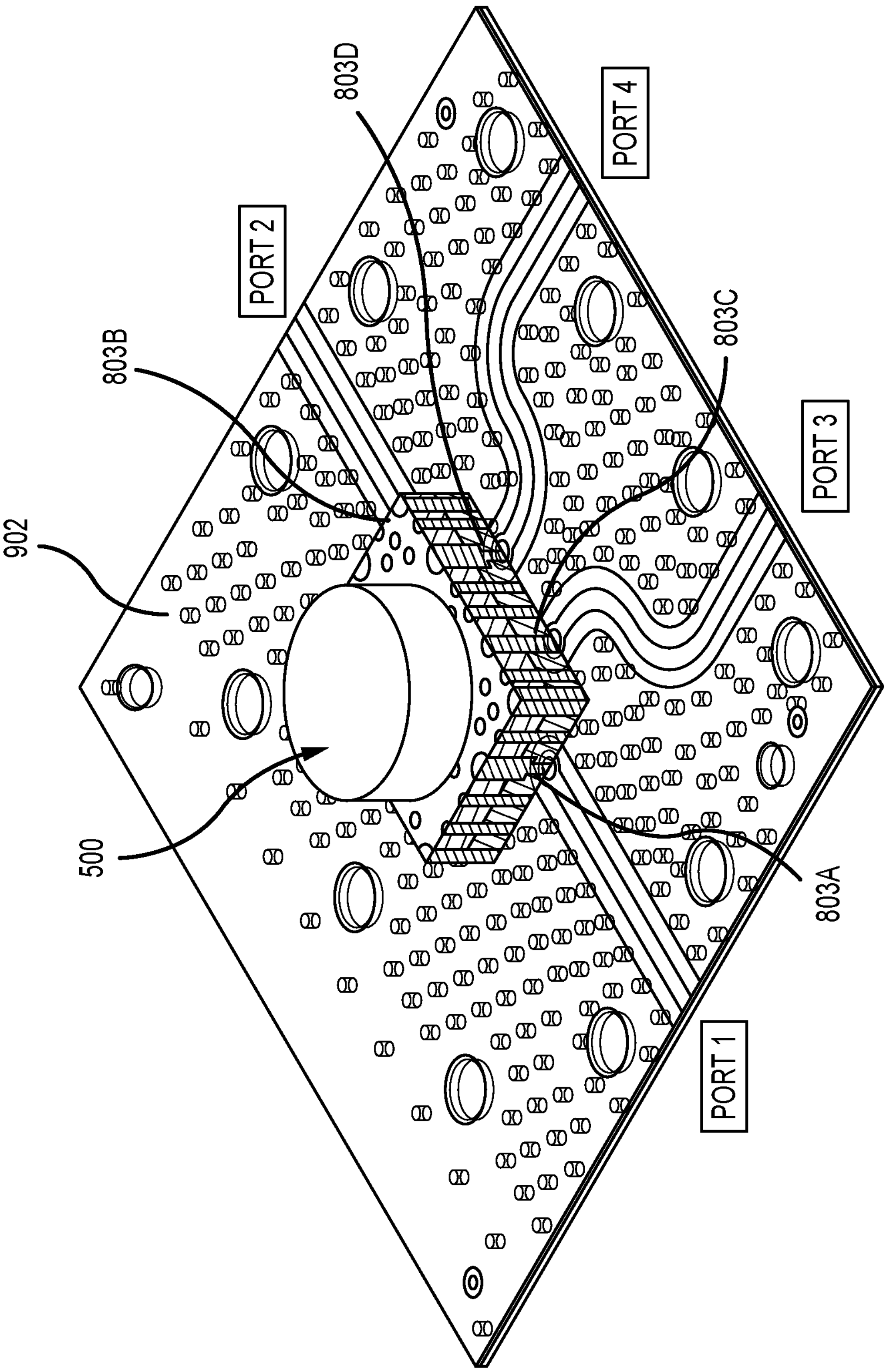
FIG. 9B illustrates a perspective view of the application of the stacked double junction circulator on a mounting test board of FIG. 9A according to one aspect of the disclosure circulator according to one aspect of the disclosure.

The stacked double junction circulator is a surface mount component that enables common solder reflow profiles. FIG. 9A illustrates a top view of an application of a stacked double junction circulator on a mounting test board according to one aspect of the disclosure. FIG. 9B illustrates a perspective view of the application of the stacked double junction circulator on a mounting test board according to one aspect of the disclosure. The device 500 may be surface mounted on a printed circuit board 902 such that the circuit ports 803A-D of the device 500 are connected to RF ports P1-P4. The device 500 includes two ferrite elements and is a non-reciprocal device with four ports. The device 500 may be replaced by device 1000 including three ferrite elements or 1100 including four ferrite elements, as illustrated in FIGS. 10 and 11 below. The circulators include a ferrite material, which, when magnetically biased, causes non-reciprocal operation.

Example Stackups Including Three Ferrite Elements and Four Ferrite Elements

A stacked double junction circulator may include two or more ferrite elements depending upon the need. FIG. 10 illustrates a sectional view of a stacked double junction circulator including three ferrite elements prior to stacking according to one aspect of the disclosure. As shown in FIG. 10, a device 1000 includes seven dielectric layers, three ferrite elements, three junction circuits, and five ground layers.

Specifically, the device 1000 includes a first dielectric layer 1012A including a bottom or a first ground plane 1010A and a first junction circuit 1008A on a top side opposite to the bottom ground plane 1010A. The device 1000 also includes a second dielectric layer 1006A including an opening or cutout for embedding a first ferrite element 1004A. The device 1000 also includes a third dielectric layer 1012B including a second ground plane 1010B on its bottom and a third ground plane 1010C on its top. The device 1000 also includes a fourth dielectric layer 1006B including an opening or cutout for embedding a second ferrite element 1004B. The device 1000 also includes a fifth dielectric layer 1012C with a second junction circuit 1008B on its bottom surface and a third junction circuit 1008C on its top surface. The device 1000 also includes a sixth dielectric layer 1006C including an opening or a cutout for embedding a third ferrite element 1004C. The device 1000 also includes a seventh dielectric layer 1012D including a fourth ground plane 1010D on its bottom surface and a fifth ground plane 1010E on its top surface.

FIG. 11 illustrates a sectional view of a stacked double junction circulator including four ferrite elements prior to stacking according to one aspect of the disclosure. As shown in FIG. 11, a device 1100 includes nine dielectric layers, four ferrite elements, four junction circuits, and six ground planes or ground layers.

Specifically, the device 1100 includes a first dielectric layer 1112A including a bottom ground plane or first ground plane 1110A and a second ground plane 1110B on a top side opposite to the bottom ground plane 1110A. The device 1100 also includes a second dielectric layer 1106A including an opening or cutout for embedding a first ferrite element 1104A. The device 1100 also includes a third dielectric layer 1112B including a first junction circuit 1108A on its bottom and a second junction circuit 1108B on its top. The device 1100 also includes a fourth dielectric layer 1106B including an opening or cutout for embedding a second ferrite element 1104B. The device 1100 also includes a fifth dielectric layer 1112C with a third ground plane 1110C on its bottom surface and a fourth ground plane 1110D on its top surface. The device 1100 also includes a sixth dielectric layer 1106C including an opening or a cutout for embedding a third ferrite element 1104C. The device 1100 also includes a seventh dielectric layer 1112D including a third junction circuit 1108C on its bottom surface and a fourth junction circuit 1108D on its top surface. The device 1100 also includes an eighth dielectric layer 1106D including an opening or a cutout for embedding a fourth ferrite element 1104D. The device 1100 includes a ninth dielectric layer 1112E including a fifth ground plane 1110E on its bottom and a sixth ground plane or a top ground plane 1110F on its top side opposite to the fifth ground plane 1110E.

Regardless of the variations in the number of ferrite elements for different configurations, the number of ferrites may equal to the number of junction circuits. For example, device 500 may include two ferrite elements and two junction circuits. Device 1000 includes three ferrite elements and three junction circuits. Device 1100 may include four ferrite elements and four junction circuits.

It will be appreciated by those skilled in the art that the device may include two or more ferrite elements, and one or more junction circuits. The device may have various variations, which may not be limited by the examples in the disclosure. For example, the device may include a single junction circuit and two ferrites. In this variation, the number of circuit may not equal to the number of junction circuits.

The stackups 500, 1000, or 1100 is built from the bottom up, the ferrite is inserted into the second dielectric layer before the third dielectric layer is added. Also, the ferrite is inserted into the fourth dielectric layer before the fifth dielectric layer is added. All layers are laminated together afterwards.

Fabrication Methods

Those skilled in the art will understand that the device 500, 1000, or 1100 may be mounted on any suitable printed circuit board manufacturing techniques. The manufacturing process results in a laminated rectangular panel that includes a single device or multiple devices.

The disclosed stacked double junction circulator device may be fabricated using the fabrication method for the single junction circulator. The fabrication of the single junction circulator of FIG. 3 can be highly automated and uses an embedded ferrite technology that was developed by the assignee of U.S. Pat. No. 8,183,952. The present disclosure expands the use of embedded ferrite technology for fabricating a stacked double junction circulator. In particular, the transitions between the two junction circuits and external interfaces are carefully designed to achieve a good match.

The devices 500, 1000, or 1100 may be fabricated as the following approach. The device is a laminated panel, which may be fabricated by sandwiching the at least five dielectric layers. The dielectric layers may have conductive layers on both top and bottom surfaces. The junction circuits may be formed on the dielectric layers by etching using standard photolithography techniques. Device performance parameters such as Return Loss, Isolation, Insertion loss, etc. are very predictable. Large laminate panels may be produced using high levels of automation. Thus, the fabrication is low-cost and suited for high-volume manufacturing.

The stacked double junction circulator device depicted in FIGS. 5-7 and 8A-8C, may be fabricated with five dielectric layers, such as 511, 506A-B, and 512A-B. The stacked double junction circulator device 500 is laminated together such that the ferrite elements 504A and 504B become embedded and integral parts of the interior dielectric layers 506A and 506B in the device 500. Any suitable process for bonding the dielectric layers 506A, 506B, 512A and 512B, and ground layers or planes 510A, 510B, 510C, and 510D together may be employed. In some variations, ground layers are bonded to the dielectric layers before lamination process.

In some variations, the dielectric layers may be fabricated using a suitable dielectric material configured to support the junction circuits. For example, dielectric layers 512A and 512B may be formed using dielectric materials suitable for printed circuit boards (PCBs). As such, the dielectric layers 512A and 512B may be fabricated using suitable materials such as polytetrafluoroethylene (PTFE), among others. The junction circuits 508A and 508A may be formed on one side of the dielectric layers 512A and 512B using PCB manufacturing techniques. The dielectric layers may be provided with conductive layers on two opposite surfaces. The conductive layers can be etched to form the junction circuits.

In some variations, the junction circuits 508A and 508A may be formed of any suitable conductive material, such as gold (Au), silver (Ag), copper (Cu), among others. The junction circuits include circuit traces.

In some variations, the dielectric layers 506A and 506B may be fabricated using a suitable dielectric material, such as suitable for printed circuit boards (PCBs). For example, the dielectric layers may be fabricated using polytetrafluoroethylene (PTFE), or a PTFE composite board. Depending on its function within the laminated multi-layer assembly, the PTFE composite board may include a copper layer disposed over the PTFE dielectric layer. Of course, the copper layer may function as a ground plane. The multi-layer PTFE composite board can be created by bonding the multi-layer laminates.

In some variations, the dielectric layers may be fabricated using a ceramic material.

In some variations, the junction circuits may also be formed by a screen-printing process.

In some variations, the ground planes may also be printed or etched upon the dielectric layers using any suitable circuit trace process. All RF ports P1, P2, P3, and P4 are formed on the bottom ground plane 510A.

In a typical production process, the dielectric layers and the ground planes or layers are stacked and laminated, The ferrite elements are embedded within the device during the stacking operation. Afterwards, the magnet 502 may be bonded to the exterior of the part in the manner depicted in FIG. 5. Then, the device 500 may be magnetically tuned and tested.

Clause 1. A device comprising: a bottom ground plane; a first dielectric layer disposed over the bottom ground plane; a first junction circuit disposed on a top side of the first dielectric layer opposite from the bottom ground plane; a second dielectric layer disposed over the first dielectric layer, the second dielectric layer having a first opening that embeds a first ferrite element; a third dielectric layer disposed over the second dielectric layer; a first middle ground layer between the second dielectric layer and the third dielectric layer; a fourth dielectric layer disposed over the third dielectric layer, the fourth dielectric layer having a second opening that embeds a second ferrite element aligned with the first ferrite element; a second middle ground layer between the third dielectric layer and the fourth dielectric layer; a fifth dielectric layer disposed over the fourth dielectric layer, wherein the fifth dielectric layer comprising a second junction circuit on a bottom side adjacent to the fourth dielectric layer.

Clause 2. The device of clause 1, further comprising a top ground plane disposed over the fifth dielectric layer opposite to the second junction circuit.

Clause 3. The device of clause 2, wherein the first junction circuit comprises a first junction of circuit traces aligned with the first ferrite element.

Clause 4. The device of clause 2 wherein the second junction circuit comprises a second junction of circuit traces aligned with the second ferrite element.

Clause 5. The device of clause 2, wherein the first junction circuit comprises: a first circuit port connected to a transmitter as a first RF port; a second circuit port connected to a first circuit port of the second junction circuit; and a third circuit port connected to an RF termination as a fourth RF port of the device.

Clause 6. The device of clause 5, wherein the second junction circuit comprises a second circuit port connecting to an antenna as a second RF port and a third circuit port connecting to a receiver as a third RF port.

Clause 7. The device of clause 2, further comprising a magnet over the top ground plane for providing magnetic bias.

Clause 8. The device of clause 1, wherein each of the first ferrite element and the second ferrite element is in one of a circular shape, triangular shape, or hexagon shape.

Clause 9. The device of clause 1, further comprising: a third junction circuit disposed over a top side of the fifth dielectric layer opposite to the second junction circuit; a sixth dielectric layer disposed over the fifth dielectric layer, the sixth dielectric layer having a third opening that embeds a third ferrite element aligned with the first ferrite element and the second ferrite element; and a seventh dielectric layer disposed over the sixth dielectric layer; a top ground plane disposed over the seventh dielectric layer; and a lower ground plane on an opposite side of the seventh dielectric layer to the top ground plane, as depicted in FIG. 10.

Clause 10. The device of clause 9, wherein the first junction circuit comprises a first junction of circuit traces aligned with the first ferrite element.

Clause 11. The device of clause 10, wherein the second junction circuit comprises a second junction of circuit traces aligned with the second ferrite element.

Clause 12. The device of clause 11, wherein the third junction circuit comprises a third junction of circuit traces aligned with the third ferrite element.

Clause 13. The device of clause 1, wherein the device is configured to be an isolator by adding a termination component.

Clause 14. The device of clause 13, wherein the termination component is integrated with the device.

Clause 15. The device of clause 13, wherein the termination component is positioned on a PCB adjacent to the device.

Clause 16. The device of clause 1, wherein the device comprises a first RF port, a second RF port, a third RF port, and a fourth RF port.

Clause 17. The device of clause 1, wherein the device is suitable for radio frequency applications.

Clause 18. The device of clause 1, wherein the device is a surface mount component on a Printed circuit board (PCB).

Clause 19. A method for fabricating the device of clause 2, comprising: embedding the first ferrite element in the first opening of the second dielectric layer; embedding the second ferrite element in the second opening of the fourth dielectric layer; aligning the first ferrite element with the second ferrite element; aligning the first junction circuit with the second junction circuit; and forming a stack including the first, second, third, fourth, and fifth dielectric layers, the top ground plane, the first and second middle ground layers, the bottom ground plane, the first junction circuit, the second junction circuit, the first ferrite element, and the second ferrite element.

Clause 20. The method of clause 19, further comprising bonding two adjacent dielectric layers using fusion bonding.

Clause 21. The method of clause 19, further comprising bonding two adjacent dielectric layers using a liquid resin or prepreg.

Clause 22. The method of clause 19, wherein the first dielectric layer comprises the first junction circuit on a top side and the bottom ground plane on an opposite side to the first junction circuit.

Clause 23. The method of clause 19, wherein the fifth dielectric layer comprises the top ground plane on a top side and the second junction circuit on an opposite side to the top ground plane.

Clause 24. The method of clause 19, wherein the forming a stack comprises: disposing the second dielectric layer over the first dielectric layer such that the first junction circuit facing the first ferrite element; disposing the fifth dielectric layer over the fourth dielectric layer such that the second junction circuit facing the second ferrite element; disposing the first middle ground layer between the second dielectric layer and the third dielectric layer; and disposing the second middle ground layer between the third dielectric layer and the fourth dielectric layer.

Clause 25. The method of clause 19, further comprising placing a magnet on the fifth dielectric layer opposite to the second junction circuit; and attaching the magnet to the fifth dielectric layer of the stack.

Any ranges cited herein are inclusive. The terms "substantially" and "about" used throughout this specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system which, as a matter of language, might be said to fall therebetween.

What is claimed is:

1. A device comprising:

a bottom ground plane;

a first dielectric layer disposed over the bottom ground plane the first dielectric layer comprising a first junction circuit disposed on a top side of the first dielectric layer opposite from the bottom ground plane;

a second dielectric layer disposed over the first dielectric layer, the second dielectric layer having a first opening that embeds a first ferrite element;

a third dielectric layer disposed over the second dielectric layer;

a fourth dielectric layer disposed over the third dielectric layer, the fourth dielectric layer having a second opening that embeds a second ferrite element aligned with the first ferrite element;

a fifth dielectric layer disposed over the fourth dielectric layer, wherein-the fifth dielectric layer comprising a second junction circuit on a bottom side adjacent to the fourth dielectric layer.

2. The device of claim 1, further comprising a top ground plane disposed over the fifth dielectric layer opposite to the second junction circuit.

3. The device of claim 2, wherein the first junction circuit comprises a first junction of circuit traces with a first central junction vertically aligned with a center respective to the first ferrite element.

4. The device of claim 2 wherein the second junction circuit comprises a second junction of circuit traces with a second central junction vertically aligned with a center respective to the second ferrite element.

5. The device of claim 2, wherein the first junction circuit comprises:

a first circuit port connected to a transmitter as a first RF port;

a second circuit port connected to a first port of the second junction circuit; and a third circuit port connected to an RF termination as a fourth RF port of the device.

6. The device of claim 5, wherein the second junction circuit comprises a second port connecting to an antenna as a second RF port and a third port connecting to a receiver as a third RF port.

7. The device of claim 2, further comprising a magnet over the top ground plane for providing magnetic bias.

8. The device of claim 1, wherein each of the first ferrite element and the second ferrite element is in one of a circular shape, triangular shape, or hexagon shape.

9. The device of claim 1, further comprising:

a third junction circuit disposed over a top side of the fifth dielectric layer opposite to the second junction circuit;

a sixth dielectric layer disposed over the fifth dielectric layer, the sixth dielectric layer having a third opening that embeds a third ferrite element aligned with the first ferrite element and the second ferrite element; and a seventh dielectric layer disposed over the sixth dielectric layer;

a top ground plane disposed over the seventh dielectric layer; and a lower ground plane on an opposite side of the seventh dielectric layer to the top ground plane.

10. The device of claim 9, wherein the first junction circuit comprises a first junction of circuit traces with a first central junction vertically aligned with a center respective to the first ferrite element.

11. The device of claim 10, wherein the second junction circuit comprises a second junction of circuit traces with a second central junction vertically aligned with a center respective to the second ferrite element.

12. The device of claim 11, wherein the third junction circuit comprises a third junction of circuit traces with a third central junction vertically aligned with a center respective to the third ferrite element.

13. The device of claim 1, wherein the device is configured to function as an isolator by connecting at least one circuit port of one junction connecting an RF termination comprising a termination component to at least one circuit port associated with one of the first or second junction circuit, wherein the at least one circuit port of the one of the first or second junction circuit does not connect to any circuit port of another of the second or first junction circuit.

14. The device of claim 13, wherein the termination component is integrated with the device.

15. The device of claim 13, wherein the termination component is positioned on a PCB adjacent to the device.

16. The device of claim 1, wherein the device comprises a first RF port, a second RF port, a third RF port, and a fourth RF port.

17. The device of claim 1, wherein the device is suitable for radio frequency applications.

18. The device of claim 1, wherein the device is a surface mount component on a Printed circuit board (PCB).

19. The device of claim 1, further comprising a first middle ground layer between the second dielectric layer and the third dielectric layer; and a second middle ground layer between the third dielectric layer and the fourth dielectric layer.

20. The device of claim 1, wherein the device is configured to operate in a clockwise direction or a counterclockwise direction depending upon an applied magnetic bias field.

21. A method for fabricating a device, the method comprising:

disposing a first dielectric layer over a bottom ground plane, the first dielectric layer comprising a first junction circuit over a top side of the first dielectric layer opposite from the bottom ground plane;

disposing a second dielectric layer over the first dielectric layer;

embedding a first ferrite element in a first opening of the second dielectric layer;

disposing a third dielectric layer over the second dielectric layer:

disposing a fourth dielectric layer over the third dielectric layer:

embedding a second ferrite element in a second opening of the fourth dielectric layer;

aligning the first ferrite element with the second ferrite element;

disposing a fifth dielectric layer disposed over the fourth dielectric layer, the fifth dielectric layer comprising a second junction circuit over a bottom side adjacent to the fourth dielectric layer:

aligning a first central junction of the first junction circuit with a second central junction of the second junction circuit; and forming a stack including the first, second, third, fourth, and fifth dielectric layers, the bottom ground plane, the first junction circuit, the second junction circuit, the first ferrite element, and the second ferrite element.

22. The method of claim 21, further comprising bonding two adjacent dielectric layers using fusion bonding.

23. The method of claim 21, wherein the fifth dielectric layer comprises a top ground plane on the top side opposite to the second junction circuit.

24. The method of claim 21, wherein the third dielectric layer comprises a first middle ground layer on its bottom side; and a second middle ground layer on its top side.

25. The method of claim 21, further comprising placing a magnet on the fifth dielectric layer opposite to the second junction circuit; and attaching the magnet to the fifth dielectric layer of the stack.

26. The method of claim 21, further comprising bonding two adjacent dielectric layers using a liquid resin or prepreg material.

* * * * *